United States Patent

[11] 3,589,170

| [72] | Inventors | Julius Praglin<br>Beachwood;<br>Gary E. Angeline, Euclid, both of, Ohio |
|---|---|---|
| [21] | Appl. No. | 724,543 |
| [22] | Filed | Apr. 26, 1968 |
| [45] | Patented | June 29, 1971 |
| [73] | Assignee | Keithley Instruments, Inc.<br>Solon, Ohio |

[54] CHROMATOGRAPH DETECTOR CELL
13 Claims, 4 Drawing Figs.

[52] U.S. Cl. ................................................. 73/23.1,
73/27, 23/254
[51] Int. Cl. .................................................... G01n 31/08,
G01n 27/18
[50] Field of Search .......................................... 73/25, 26,
23.1, 27, 61, 61.1; 23/254, 254 E, 255 E, 297;
215/54, 52, 53, 48; 220/24.5

[56] References Cited
UNITED STATES PATENTS

| 2,764,184 | 9/1956 | Fitzhugh et al. | 220/24.5 |
| 2,821,323 | 1/1958 | Lee | 220/24.5 |
| 2,993,616 | 7/1961 | Carlile, Jr. et al. | 220/24.5 |
| 1,768,415 | 6/1930 | Matunaga | 73/27 X |
| 2,422,604 | 6/1947 | Weber | 73/26 X |
| 2,916,358 | 12/1959 | Valentine et al. | 23/254 |
| 3,138,436 | 6/1964 | Harmon | 73/27 X |
| 3,153,577 | 10/1964 | McCully et al. | 23/255 |

OTHER REFERENCES

Phillips, " Gas Chromatography," 1957, at page 36, Library II QD 2.71 P5

*Primary Examiner*—Richard C. Queisser
*Assistant Examiner*—Ellis J. Koch
*Attorney*—Yount and Tarolli ABSTRACT: A chromatograph column of compacted adsorbent material is connected to a chromatograph detector cell for detecting the passages of unknowns. The detector cell has temperature sensors disposed in individual members, e.g., block, which have aligned fluid passageways therein for conducting liquid from the column through the cell. A compressible seal member is disposed between the blocks and has an opening through which the liquid flows from one block to the other. The blocks are pressed together to seal against the sealing member. The temperature sensor in each block is sealed to prevent leakage by a compressible sleeve which seals against the sensor and the block when forced inwardly. Inlet and outlet conduits to the cell are constructed from a compressible material and have flanged ends which are sealed against the blocks by conduit couplings threadably inserted into the central bores of the fasteners.

PATENTED JUN29 1971

3,589,170

INVENTORS
JULIUS PRAGLIN
GARY E. ANGELINE
BY
*Yount, Flynn & Tarolli*
ATTORNEYS

CHROMATOGRAPH DETECTOR CELL

This invention relates to a chromatograph detector cell for detecting the presence of liquid chemicals in a carrying liquid by various exothermic or endothermic processes including adsorption and ion exchange.

In the practice of chromatography wherein unknown substances contained in a liquid are separated from each other in a column of stationary phase material by an eluant which moves the unknown substances through the column at different rates according to their affinity for the stationary phase material, it is desirable to sense the passage of each separated unknown substance from the column. To accomplish this result, a chromatograph detector cell is provided having a fluid passageway through which the eluant and unknown substances flow. Part of the passageway has a material compacted therein. As an unknown substance flows through the chromatograph detector cell, temperature changes occur in the area of the material due to various exothermic or endothermic processes. The temperature in this area is sensed by a temperature sensor and compared with the temperature of the fluid entering the cell, which is sensed by a different temperature sensor, to indicate respectively the passage of an unknown substance through the fluid passageway of the chromatograph detector cell.

Since the eluant used to move the unknown substances through the column is normally chemically active, it is desirable that the chromatograph detector cell have a chemically inert fluid passageway to prevent corrosion of the passageway and resultant leakage. To facilitate changing of the material in the chromatograph cell, it is desirable that the fluid passageway be formed in sections which may be readily connected in an aligned fluid-sealing relation by a chemically inert seal and furthermore that the fluid passageway be easily connected in an aligned fluid-sealing relation with the conduits that supply and remove the fluid passing through the chromatograph cell. Also, to enable the temperature sensors to accurately and effectively sense the temperature in the fluid passageway, it is desirable that they be exposed to the fluid in the passageway. This renders it necessary to use a fluid seal which should be a chemically inert seal.

Accordingly, it is an object of the present invention to provide a chromatograph detector cell in which the fluid contacts only chemically inert material of the detector cell as it is introduced into and leaves the cell, and as it travels through the cell.

It is another object of the present invention to provide a chromatograph detector cell having a fluid passageway formed in sections which may be readily aligned and connected in fluid-sealing relation with a chemically inert seal which is such that there is no significant leakage at the seal.

It is still another object of the present invention to provide a chromatograph detector cell in which the fluid in entering, passing through and leaving the cell only engages chemically inert material of the detector cell with the cell being so constructed that there is no significant leakage from the cell.

It is another object of the present invention to provide a chromatograph detector cell comprised of a plurality of sections which may be readily assembled and connected in an aligned fluid-sealing relation to the conduits that supply and remove the fluid that flows through the chromatograph detector cell.

It is a further object of the present invention to provide a chromatograph detector cell in which the temperature sensors are disposed in the sidewalls of the passageway and have connections leading from the fluid passageway out of the cell with leakage thereabout prevented by a chemically inert seal preferably formed by a chemically inert material squeezed into sealing engagement with the member forming the passageway and with a chemically inert envelope for the temperature sensors.

In the disclosed structure, the chromatograph detector cell has a two-section fluid passageway, each section being formed in separate chemically inert blocks, which are disposed in a holder and connected in fluid-sealing relation by a chemically inert and compressible seal member compressed therebetween. Chemically inert and compressible conduits, with flanges formed on the ends thereof, are connected to the fluid passageway of the chromatograph detector by coupling means disposed in the holder which press the compressible conduit flanges against the chemically inert blocks. Alignment between the two fluid passageway sections is effected by seal-engaging shoulder means formed on each of the chemically inert blocks, and alignment between the fluid passageway formed in each block and a conduit is effected by a block-engaging shoulder formed in the holder in spaced relation to the conduit coupling means. In addition, the temperature sensors are disposed in openings extending laterally from the fluid passageway by chemically inert and compressible sleeves which constrict about the temperature sensors and expand against the openings to provide a tight fluid seal.

Still other objects, features and attendant advantages will become apparent to those skilled in the art from a reading of the following description of one physical embodiment in accordance with the invention, taken in conjunction with the accompanying drawings wherein.

Figure 1:
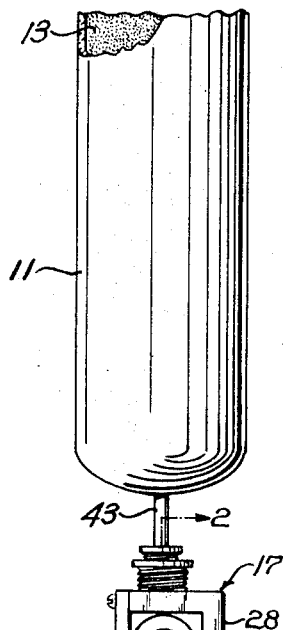
FIG. 1 is a diagrammatic illustration of a chromatograph detector cell in accordance with the present invention being used with a column of stationary phase material in a chromatograph process.

Referring generally to the figures in the drawing, in FIG. 1 is shown diagrammatically a tube 11, compacted with a material 13, for example silica gel, to form a column, and having an outlet connected by a conduit 43 to a chromatograph detector cell, generally indicated at 17, adapted to sense the passage of unknown substances flowing from the column during a chromatograph process. In a chromatograph process, a liquid containing unknown substances is deposited on the column of material 13. Next, an eluant, for example benzene, is poured through the column which moves the unknown substances therethrough at different rates depending on their affinity for the material 13, thereby separating the unknown substances and causing them to flow from the bottom of the tube 11 in a chronological order. The fluid from the tube 11 is passed by the conduit 43 to the chromatograph detector cell 17 for indicating the passage of unknowns by sensing the temperature changes around a material which is contained in a fluid passageway through the cell and is filterable and insoluable in the eluant. After passing through the chromatograph cell 17, the unknown substances may be passed to further apparatus, not shown, by another conduit 43.

Figure 2:
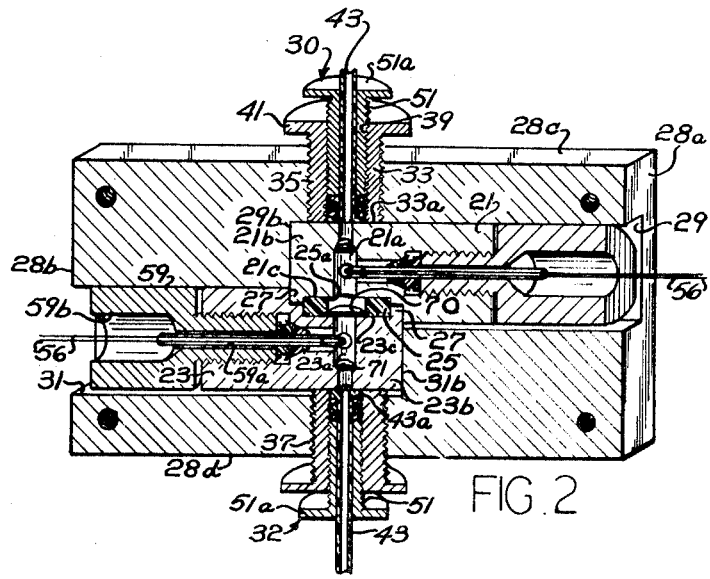
FIG. 2 is a cross-sectional view of a chromatograph detector cell constructed in accordance with the present invention.

As particularly shown in FIG. 2, the chromatograph detector cell 17 has a fluid passageway with sections thereof 21a, 23a being formed in the overlapping reduced end portions 21b, 23b of two elongated and identical blocks 21, 23 respectively. A block-shaped seal member 25 with a fluid passageway 25a therethrough, which may have a filter 70 removably located therein, is disposed between the overlapping end portions of the two blocks 21, 23 and is received in recesses 21c, 23c formed in the reduced end portions normal to the fluid passageways. The reduced end portions have shoulders 27 at their outer ends which extend for less than one half of the transverse dimension of the seal member 25, and which are abutted by the seal member. The seal-engaging shoulders 27 align the passageway of the seal 25 with the sections of the passageway formed in the blocks 21, 23 and align the passageways of the blocks 21, 23 with each other.

The blocks 21, 23 are constructed from a material that is chemically inert to the eluant and other unknown substances passing through the chromatograph detector cell 17 and which is preferably a form of plastic resistant to deformation. One such suitable material is a chlorotrifluoroethylene polymer. The block-shaped seal member 25 is also constructed from a material which is chemically inert to the eluant and unknown substances passing therethrough, but which is preferably a compressible and chemically inert material such as polytetrafluoroethylene.

The blocks 21, 23 along with the seal member 25 are disposed in an elongated holder 28 constructed from a suitable substantially deformation-resistant material, such as steel. The holder 28 has first and second offset slots 29, 31 for receiving the blocks 21, 23 respectively. The slots 29, 31 extend inwardly from laterally opposite ends 28a, 28b respectively of the holder 28 to inner end walls 29b, 31b respectively. The offset slots 29, 31 overlap each other at their inner ends and open into each other throughout the distance of the overlap. The inner end walls 29b, 31b of the offset slots 29 and 31 serve as block-engaging shoulders which position the blocks 21, 23 in the holder 27 with respect to fluid inlet and fluid outlet connections, generally indicated at 30, 32.

A tight seal is effected between the fluid passageway 21a, 23a of the blocks 21, 23 by pressing the blocks together to exert a compressive force on the block-shaped seal member 25 and deform it to form a seal between the blocks 21, 23 and the seal member 25 to prevent leakage of the liquid from passageways 21a, 23a. The blocks and seal member are pressed together by tubular threaded fasteners 33 which are threaded into threaded bores 35, 37 formed in the top and bottom portions 28c, 28d of the holder 28 as part of the fluid inlet and fluid outlet connections 30, 32 respectively. The inner ends of the fasteners engage the blocks 21, 23 to force them inward. The blocks 21, 23 are positioned with respect to the fluid inlet and fluid outlet connections 30, 32 respectively so that the central bores 39 of the tubular fasteners 33 are aligned with the fluid passageways 21a, 23a of the blocks 21, 23. The block-engaging fasteners 33 have heads 41 thereon for gripping purposes.

Figure 3:
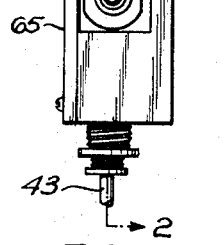
FIG. 3 is an exploded view illustrating some of the components used to dispose a temperature sensor and a conduit in fluid-sealing relation to the fluid passageway formed in a chemically inert block.
Figure 3:
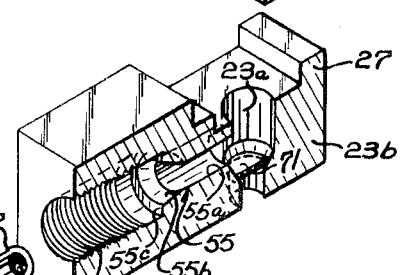

Conduits 43, each having an annular flange 43a formed on the end thereof, are readily aligned with the fluid passageways 21a, 23a formed in the blocks 21, 23 by insertion into the central bores 39 of the block-engaging fasteners 33. As more clearly shown in FIG. 3, the conduits each have a pair of washers 45, 47 with an O-ring 49 therebetween disposed thereon and is received in a central opening of a tubular, externally threaded conduit coupling 51. The conduit couplings 51 are threaded into the bores 39 of the block-engaging fasteners 33 press the washers 45, 47 and the O-ring 49 toward the blocks to firmly press the flanges 43a thereon against the blocks. A seal is effected between the conduits 43 and the blocks 21, 23 by constructing the conduits 43 from a compressible chemically inert material which is deformed in fluid-sealing relation to the blocks by the pressure exerted against the conduit flanges 43a when the couplings 51 are threadably inserted into the bores of the fasteners 33. The threadable insertion of the conduit couplings 51 is facilitated by an annular flange 51a formed on the couplings 51 which enable it to be more easily gripped.

The conduits and flanges are constructed from a compressible material that is chemically inert to the eluant and other unknown substances passing therethrough, and which is preferably of a material such as polytetrafluoroethylene. The block-engaging fasteners 33 and the conduit couplings 51 are constructed from material which is non-cold-flowing and substantially deformation-resistant. Although the fasteners 33 and the couplings 51 are not in contact with the eluant and unknown liquids, they are preferably constructed from a chemically inert material. While the fasteners 33 and couplings 51 may be constructed from the same material as the blocks 21, 23 they may also be constructed from materials such as nylon and brass.

Figure 4:
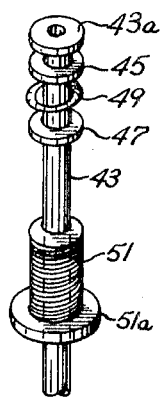
FIG. 4 is an enlarged cross-sectional view of a portion of FIG. 2 illustrating the manner in which a temperature sensor is sealed in the fluid passageway of one of the blocks.
Figure 4:
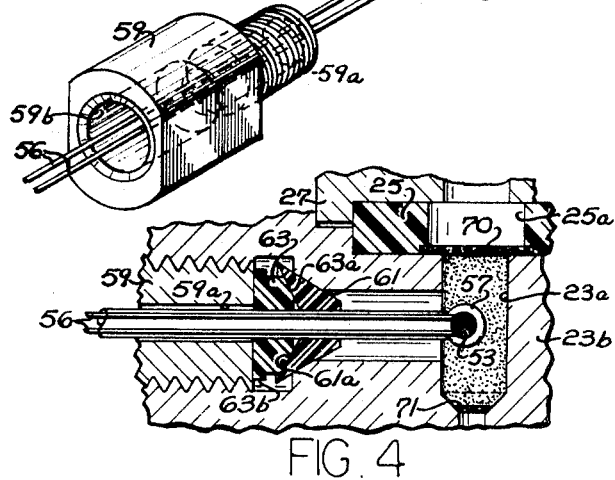

Two temperature sensors in the form of thermistors 53 are associated with the fluid passageways 21a, 23a of the blocks 21,23 and are disposed in respective bores, generally indicated at 55, which extend lengthwise from the fluid passageways to the ends of the blocks. As more clearly shown in FIGS. 3 and 4, the bores 55 each have a reduced inner portion 55a, opening into the fluid passageway, and an enlarged outer portion 55d. The reduced portion includes a conically shaped passageway 55b and an annular flange 55c which joins with the enlarged portion 55d. The enlarged portion is threaded and opens onto the end of the block. Each thermistor element 53 comprises a pair of leads for making connection thereto and a chemically inert envelope 57, e.g. glass, having a cylindrical portion 57a. The thermistors 53 are each received in tubular bushings 59 which are threaded into the enlarged bore portion 55d of the corresponding bore 55. The bushings each have an opening 59a therethrough in which the cylindrical portion 57a of the corresponding thermistor envelope 57 is received. The thermistor envelopes 57 terminate short of the length of the bushings 59 and the leads 56 extend outwardly from the chemically inert envelopes.

The temperature sensors 53 are sealed in the fluid passageways 21a, 23a of the blocks 21, 23 by compressible frustoconical sleeves 61 which are pressed into the conical recesses 55b by force-exerting expander plugs 63 as the bushings 59 are threaded into the bores 55d. The sleeves 61 are disposed about the thermistor envelopes 57a and have a conical recess 61a formed in the rearward end. The expander plugs 63 have a tapered end 63a, which engages the conical recess 61a in the sleeves, and an annular flange 63b which engages the forward end of the bushings 59. When the bushings 59 are threadably inserted into the bores 55d of the blocks, they engage the plugs 63 and force the tapered end 63a of each against the conical recess 61a of the corresponding sleeve 61. The forces exerted on the sleeves 61 by the expander plugs 63 squeeze the forward portion of the sleeves 61 into the reduced portion 55a of the bores, thereby causing them to constrict about the thermistor envelopes 57a in fluid-sealing relation thereto. In addition, the rearward portion of the sleeves 61 are expanded and pressed against the conical recesses 55b in fluid-sealing relation thereto. The frustoconical sleeves and the expander plugs may both be constructed from a compressible and chemically inert material, for example polytetrafluoroethylene.

The outer ends 59b of the openings 59a in the bushings 59 through which the leads 56 of the temperature sensors 53 extend are enlarged to enable a suitable sealing compound to be received therein. Also, the holder 28 is covered with a plate 65 which is attached thereto by any suitable means, e.g., screws, to protect the components disposed therein as well as to limit the space into which the block-shaped seal member 25 may be deformed. The plate is preferably flush against the adjacent side of the blocks 21, 23.

In operation, the chromatograph detector cell 17 may be quickly assembled and connected to a chromatograph apparatus to sense the passage of unknown substances. Suitable thermistors are inserted through the central bores of a frustoconcial sleeve 61, a cylindrical sealing plug 63 and a bushing 59, which are then inserted into the bores 55 formed in the blocks 21, 23 with the thermistors 53 positioned in the fluid passageways 21a, 23a. The thermistors 53 are sealed in the bores 55 by the threaded movement of the bushing 59 which forces the tapered end 63a of the plug 63 against the conical recess 61a of the sleeve 61. The force exerted on the sleeve squeezes the forward portion of the sleeve into the reduced portion of the bore 55a, thereby constricting the sleeve about the thermistor envelope 57a in fluid-sealing relation. Also, the plug 63 presses the rearward portion of the sleeve 61 against the conical recess 55b and expands it into fluid-sealing relation thereto.

Next, a material is compacted in the fluid passageway of one of the blocks 21 or 23, in this instance block 23, which is to be on the outlet side of the detector cell 17, and the fluid passageways 21a, 23a of the blocks 21, 23 are aligned with each other and the fluid passageway 25a of a seal 25 by placing the block-shaped seal member 25 between the laterally opposite shoulders 27 on the recessed surfaces 21b, 23b of the blocks. The blocks 21, 23 are placed in the slots 29, 31 in engagement with the shoulders 29b, 31b respectively of the holder 28, which is then covered with a plate 65 that laterally aligns the blocks 21, 23 and the seal 25. The fluid passageways 21a, 25a, 23a are then sealed together by threading block-engaging tubular fasteners 33 into bores 35, 37 formed in the top and bottom portions 28c, 28d of the holder 28. As the blocks 21, 23 are pressed together, the seal 25 is compressed therebetween and deformed to form a fluid-seal with the blocks.

The chromatograph detector cell 17 is then connected to the column of material 13 and the remainder of the chromatograph apparatus by conduits 43 to enable the eluant and unknown substances to pass through the fluid passageway of the chromatograph detector cell 17. Since the fasteners 33 are disposed in bores 35, 37 formed in a predetermined spaced relation to the block-engaging shoulders 29b, 31b, the conduits 43 are readily aligned with the fluid passageway of the detector cell 17 upon insertion into the central bores 39 of the fasteners 33. The conduits 43 are sealed to the blocks 21, 23 and fastened to the detector cell 17 by the washers 45, 47 and O-ring 49 pressed against the conduit flange 43a by the couplings 51 threadably inserted into the central bores of the fasteners 33. As the conduit flanges 43a are pressed against the blocks, they are deformed into fluid-sealing relation thereto.

As each separated unknown substance is moved through the tube 11 by an eluant flowing therethrough, it passes through the sealed conduit 43 to the fluid passageway 21a of the first block 21 where the ambient temperature is sensed by the first temperature sensor. Then the unknown substance flows through the block-shaped seal 25 to the fluid passageway 23a of the second block 23 where it interacts with the material compacted therein. The temperature in the area of the material, which is affected by the unknowns contacting the material, is sensed by the second temperature sensor. The time a temperature change occurs and the magnitude of the change are a function of the unknown and the amount of unknown present.

As illustrated in the drawings, filter 70, 71 may be used on opposite sides of the filterable material in passageway 23a to keep the material in place. As illustrated, the filter 70 is received in a counterbore of the passageway 25a. Moreover, while in a system using silica gel, the thermal process is one which involves absorption, it is understood that the thermal process causing the change in temperature in passageway 23a may be produced by other types of thermal processes, such as ion exchange.

What is claimed is:

1. A chromatograph detector cell for detecting the passage of unknown fluids from a chromatograph column, said cell comprising means defining a fluid passageway chemically inert throughout its entire length to the fluids flowing therethrough and having first and second portions with the second portion adapted to have a material compacted therein, a first temperature sensor associated with the first portion of the fluid passageway in a chemically manner and adapted to sense the temperature therein, and a second temperature sensor associated with the second portion of the fluid passageway in a chemically inert manner adapted to sense the temperature therein, said means defining the chemically inert fluid passageway comprising a first substantially deformation-resistant and chemically inert member having the first portion of the fluid passageway formed therethrough, a second substantially deformation-resistant and chemically inert member having the second portion of the fluid passageway formed therethrough, said first and second members each having an opening extending from said fluid passageway outwardly to an external side of said member, said first and second temperature sensors being disposed in the openings in said first and second members respectively and each comprising a temperature sensing element and a chemically inert and thermally conductive envelope for said temperature sensing element, first and second chemically inert sealing members disposed on said first and second temperature sensor envelopes respectively for preventing leakage of fluid from the fluid passageways through the openings in said first and second members, first and second force-exerting members disposed respectively on said first and second temperature sensor envelopes outwardly of said sealing members and movable inwardly in the opening to move said sealing member inwardly toward the fluid passageway, the openings formed in said first and second members being defined by wall means having a reduced portion inwardly of said sealing members and into which said sealing members are adapted to be forced by said force-exerting members to constrict said sealing members about said temperature sensor envelopes in fluid-sealing relation thereto and said sealing members having an outer portion expanded by said force-exerting members in fluid-sealing relation against the wall means defining said openings in said first and second members, a compressible and chemically inert seal member with a fluid passageway formed therethrough being disposed with the fluid passageway thereof in fluid communication with the fluid passageways of said first and second members, said compressible seal member being adapted to be deformed in fluid-sealing relation to the first and second members, and means adapted to press said first and second members against said compressible seal member to deform said seal member in fluid-sealing relation with the fluid passageways of said first and second members.

2. In a chromatograph detector cell for detecting fluids according to claim 1, further comprising a conduit in fluid communication with the fluid passageway of one of said members and chemically inert to the fluids flowing therethrough, said conduit having a compressible flange formed thereon and in engagement with the surface of said member surrounding the fluid passageway formed therein, and means adapted to press the compressible flange of said conduit against the surface of said member to deform the flange in fluid-sealing relation to said member to prevent leakage of the fluid passing between said conduit and the fluid passageway of said member.

3. In a chromotograph detector cell for detecting fluids according to claim 2, said seal member having external edges and the fluid passageway formed therethrough with external openings in spaced relation to an adjacent edge of said seal member, said first and second members each having a shoulder formed thereon adjacent to an external opening of the fluid passageway formed therethrough, said shoulders on said first and second members each being adapted to engage an edge of said seal member adjacent an external opening of the fluid passageway formed therethrough, and said shoulders of said first and second members each being formed in spaced relation to the external opening of the fluid passageway of said member to effect alignment thereof with the opening of the fluid passageway of said seal member and establish fluid communication therebetween.

4. In a chromatograph detector cell for detecting fluids according to claim 3, further comprising a holder having first and second laterally offset slots formed therein and adapted to have said first and second members disposed respectively therein, said first and second slots formed in said holder having overlapping inner portions opening into each other to enable the fluid passageways of said first and second members to be in fluid communication with each other, said holder having first and second spaced shoulders formed therein transversely to said slots and adjacent the overlapping portions of said first and second slots respectively and adapted to be engaged by said first and second members respectively to position said members in said slots, said holder having inlet and outlet openings formed therein which open into the overlapping portions of said first and second slots respectively, said inlet and outlet openings being formed in spaced relation to said first and second shoulders respectively to effect alignment with the fluid passageways of said first and second members respectively.

5. In a chromatograph detector cell including a body having a fluid passageway therethrough and an opening extending from said fluid passageway outwardly to an external surface of said body, a temperature sensor disposed in the opening in said body and comprising a temperature-sensing element and a thermally conductive envelope for said temperature-sensing element, a deformable sealing member disposed on said temperature-sensor envelope for preventing leakage from the fluid passageway through the opening in said body, a force-exerting member disposed on said temperature-sensor envelope outwardly from said sealing member and movable toward the fluid passageway, said sealing member having forward and rearward radially outwardly tapering surfaces formed thereon, the opening formed in said body being defined by wall means having a reduced portion inwardly of said sealing member and into which said forward tapering surface on said sealing member is adapted to be forced by said force exerting member to constrict said sealing member about said temperature-sensor envelope in fluid-sealing relation thereto, said force exerting member being engageable with said rearward tapering surface on said sealing member whereby said rearward tapering surface is expanded by said force-exerting member in fluid-sealing relation against said wall means.

6. In a chromatograph detector cell as defined in claim 5, wherein said force-exerting member has a tapered leading portion adapted to engage said rearward tapering surface and force said rearward tapering surface into engagement with said wall means.

7. In a chromatograph detector cell according to claim 5, wherein said seal member has a generally V-shaped cross-sectional configuration with the axis of the V lying along the axis of said temperature sensor.

8. In a chromatograph detector cell including a body having a fluid passageway formed therethrough and defining an external surface surrounding the fluid passageway, said fluid passageway being adapted to have a material compacted therein, temperature-sensing means associated with the fluid passageway and adapted to sense the temperature therein, and a conduit disposed in fluid communication with the fluid passageway of said body to enable fluids to flow between the conduit and the fluid passageway, the improvement comprising, a compressible flange formed on said conduit in engagement with the surface of said body surrounding the fluid passageway, and means adapted to press the compressible flange of said conduit against the surface of said body surrounding said fluid passageway to deform said flange in fluid-sealing relation to said body to prevent leakage of the fluid flowing between said conduit and the fluid passageway of said body.

9. In a chromatograph detector cell according to claim 8, further comprising a holder having a slot formed therein and adapted to have said body disposed therein, said holder having a shoulder formed therein transversely to said slot and adapted to position said body in said slot, said holder having an opening formed therein which opens into the slot in spaced relation to the transverse shoulder and in alignment with the fluid passageway of said body disposed in said slot in engagement with said shoulder, said means to press the compressible flange of said conduit against said body being coupling means disposed in said opening of said holder and having a central bore formed therein, and said conduit being disposed in the central bore of said coupling means in alignment with the fluid passageway of said body.

10. In a chromatograph detector cell including first and second members each having a fluid passageway formed therethrough and opening onto an external surface, said first and second members being adapted to be disposed with the fluid passageways thereof in fluid communication with each other, the fluid passageway of said second member being adapted to have a material compacted therein, temperature-sensing means associated with the fluid passageway of said second member and adapted to sense the temperature therein, and a seal member having a fluid passageway formed therethrough with external openings, said seal member being adapted to be disposed in fluid-sealing relation to the external surfaces of said first and second members with the fluid passageway of said seal member being in fluid communication with the fluid passageways of said first and second members, the improvement comprising said seal member having external edges with the external openings of the fluid passageway of said seal member being formed in spaced relation to an adjacent edge of said seal member, said first and second members each having a shoulder formed thereon adjacent to the fluid passageway opening on the external surface thereof, said shoulders on said first and second members each being adapted to engage an edge of said seal member adjacent an external opening of the fluid passageway formed therethrough, said shoulders on said first and second members each being formed in spaced relation to the external opening of the fluid passageway of the external surface of said member to effect alignment thereof with the opening of the fluid passageway of said seal member and establish fluid communication therebetween.

11. In a chromatograph detector cell according to claim 10, said seal member being block-shaped with the external openings of the fluid passageway of said seal member being on laterally opposite sides, and said first and second members each having laterally opposite shoulders formed thereon with said shoulders being adapted to engage laterally opposite sides of said seal member to effect alignment between the fluid passageways of said first and second members.

12. In a chromatograph detector cell including first and second members each having a fluid passageway formed therethrough, a compressible seal member with a fluid passageway formed therethrough being disposed with the fluid passageway thereof in fluid communication and coaxial with the fluid passageways of said first and second members, a holder having first and second longitudinally extending open slots formed therein with an opening formed therebetween, the longitudinal axis of said slots extending generally transverse to the longitudinal axis of said coaxial fluid passageways in said first and second members and said seal member, said first and second members being disposed respectively in said first and second slots and said seal member being disposed in the opening between said slots, said compressible seal member being adapted to be deformed in fluid-sealing relation to said first and second members, a cover plate attached to said holder and covering said first and second slots and the opening therebetween to laterally align said first and second members and said seal member disposed in said holder and confine the deformable seal member to limit the space into which it may be deformed, and said holder having first and second fastening means disposed therein and adapted to engage said first and second members respectively, said first and second fastening means being adapted to exert forces against said first and second members in a direction parallel to the axis of said fluid passageway thereby to press said first and second members against said compressible seal member to deform said seal member in fluid-sealing relation to the fluid passageways of said first and second members.

13. A chromatograph detector cell for detecting the passage of unknown fluids from a chromatograph column, said cell comprising means defining a fluid passageway chemically inert throughout its entire length to the fluids flowing therethrough and having first and second portions with the second portion adapted to have a material compacted therein, a first temperature sensor associated with the first portion of the fluid passageway in a chemically inert manner and adapted to sense the temperature therein, a second temperature sensor associated with the second portion of the fluid passageway in a chemically inert manner and adapted to sense the temperature therein, a conduit in fluid communication with said fluid passageway and chemically inert to the fluids flowing therethrough, said conduit having a compressible flange formed thereon in engagement with said means defining the fluid passageway, and means adapted to press the compressible flange of said conduit against said means defining the fluid passageway to deform said flange in fluid-sealing relation thereto so as to prevent leakage of fluid flowing between said conduit and said fluid passageway defining means.